Figure 3:
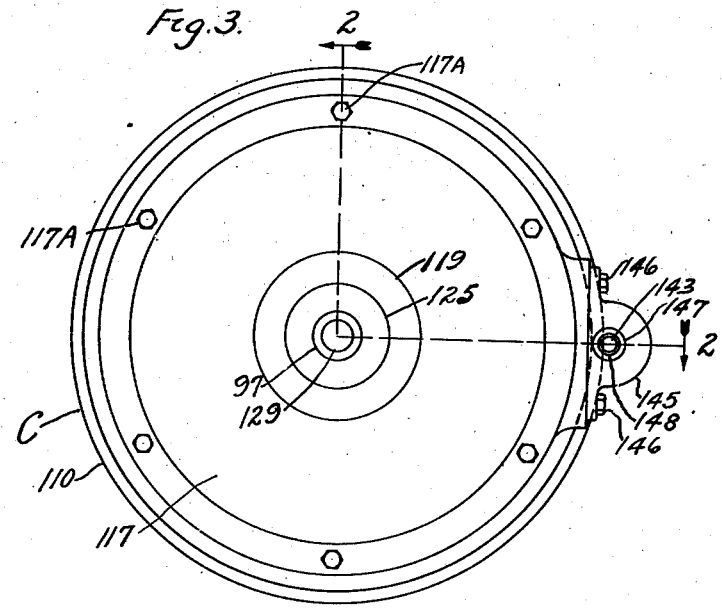

June 29, 1937.  T. M. MUELLER  2,085,668

TRANSMISSION

Filed March 16, 1936  2 Sheets-Sheet 1

INVENTOR.

Theodore M. Mueller

BY

George B. Ingersoll

ATTORNEY.

June 29, 1937.  T. M. MUELLER  2,085,668
TRANSMISSION
Filed March 16, 1936  2 Sheets-Sheet 2
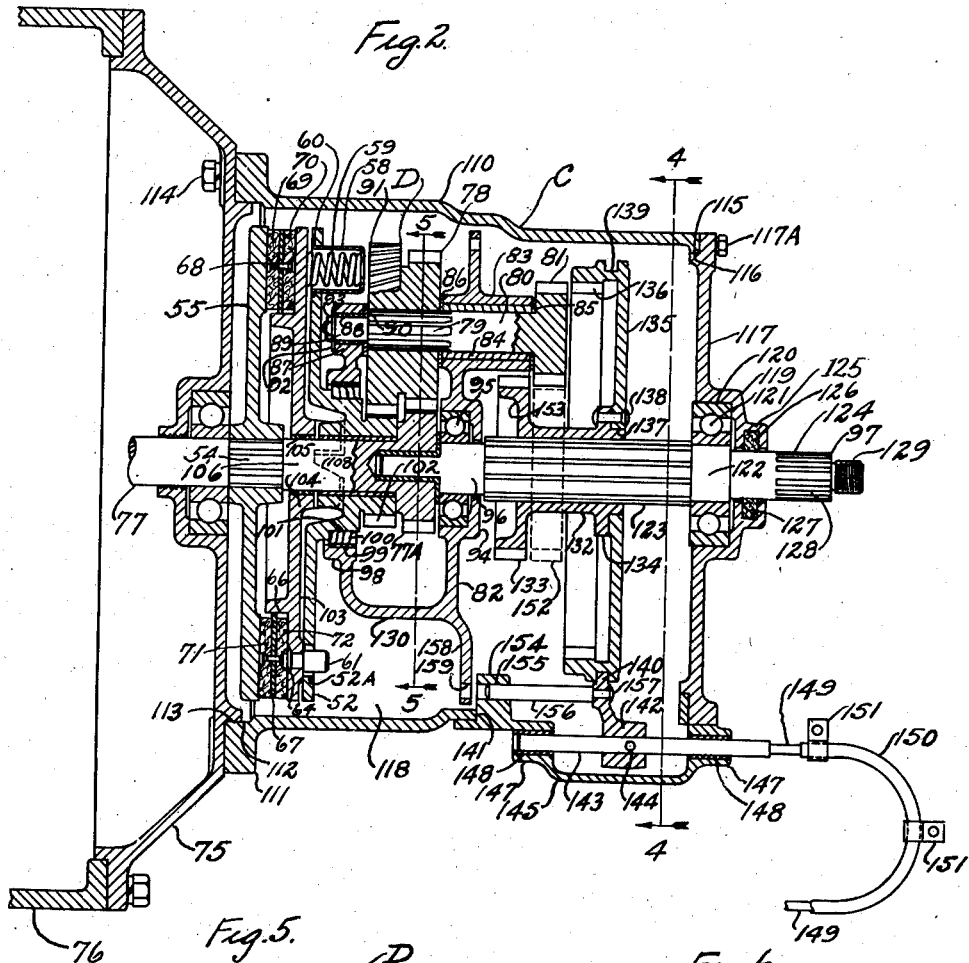
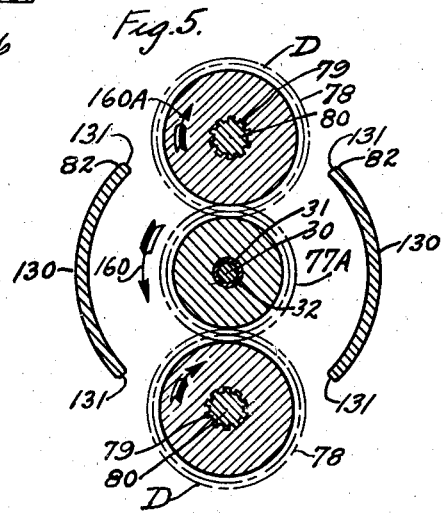
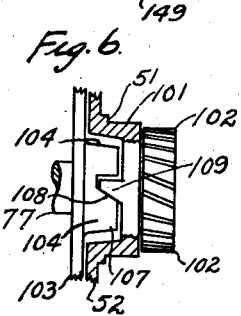
INVENTOR.
Theodore M. Mueller
BY George B. Ingersoll
ATTORNEY.

Patented June 29, 1937

2,085,668

UNITED STATES PATENT OFFICE 2,085,668

TRANSMISSION

Theodore M. Mueller, Pontiac, Mich.

Application March 16, 1936, Serial No. 69,002

13 Claims. (Cl. 74—259)

My invention relates to improvements in transmissions in which changes of speeds are accomplished automatically, and the objects of my improvements are, first, to provide a transmission device in which changes of speeds are accomplished automatically in accordance with the amount of torque resistance imposed thereon; second, to provide a transmission having a revolvably mounted countershaft carrier with means whereby the reactionary forces of the transmission are utilized to be fed or passed back to a drive shaft of the transmission to prevent the rollably mounted countershaft carrier from running backwards; third, to provide a transmission in which reactionary forces developed in the transmission are fed or passed back in the drive shaft of the transmission in varying amounts in accordance with increased torque reactions on the transmission; fourth, to provide a transmission in which reactionary forces developed in the transmission are fed or passed back into a drive shaft through a plurality of driving means; fifth, to provide a transmission with frictional means for inversing reactionary forces tending to operate the transmission in one direction to resist operation of the transmission in said one direction; sixth, to provide a transmission having a frictional clutch mechanism with gear mechanism adapted to generate, in their meshing engagement, thrust reactions for causing the frictional clutch mechanism to engage with increased pressures; seventh, to provide a transmission having a clutch mechanism actuated to increased engagement pressures by spiral gear mechanism; eighth, to provide a transmission having a clutch mechanism actuated to increased engagement pressures by a gear mechanism comprising a dog clutch; ninth, to provide a transmission having a drive shaft for driving a clutch mechanism together with a countershaft gear mechanism operatively connected with the clutch mechanism by a gear train having an overdrive ratio; tenth, to provide a transmission having a countershaft gear mechanism rotatably mounted to move around the axis of the drive shaft and adapted to be driven through a clutch mechanism in high speed operation; eleventh, to provide a transmission having a countershaft gear mechanism rotatably mounted to move around the axis of a drive shaft and adapted to be driven through a gear train in low speed operation; twelfth, to provide a transmission having a countershaft gear mechanism rotatably mounted to move around the axis of a drive shaft and adapted to be driven by the drive shaft through either or both of a frictional clutch mechanism or a gear train; thirteenth, to provide a transmission in which changes of speed are accomplished automatically in accordance with the amount of torque resistance imposed thereon with means for locking the transmission against "free wheeling" when operating in reverse; and fourteenth, to provide a transmission having a feed back between driven and drive shafts to accomplish inverse torque variation.

I attain these objects by the mechanism illustrated in the accompanying drawings, in which:—

Figure 4:
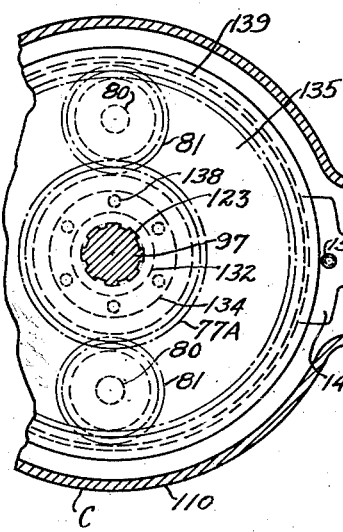
Figure 1:
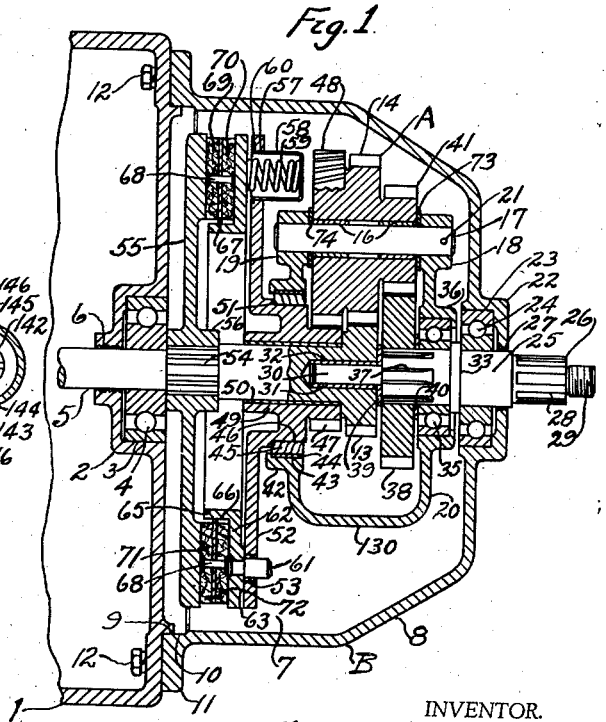

Figure 1 is a vertical section of the transmission device taken along its longitudinal center or axis and disclosed as an automatic torque converter associated with an electric power unit; Fig. 2, a section of the transmission device in association with a clutch housing of an automotive vehicle, said sectional view being taken on the line 2—2, Fig. 3; Fig. 3, an end view of the transmission mechanism disclosed in Fig. 2; Fig. 4, a sectional view of the transmission mechanism disclosed in Fig. 2 and taken on the line 4—4, Fig. 2; Fig. 5, a partial sectional view of the transmission device disclosed in Fig. 2, said partial sectional view being taken on the line 5—5, Fig. 2; and Fig. 6, a partial side and sectional view of a dog or tooth clutch drive mechanism of the transmission.

Figure 1 discloses my transmission mechanism or assembly B for use with electrical or similar power units which may be utilized in industrial installations such as drill presses, tapping, and similar machines, my invention being adapted for use in such installations without the necessity of using switch mechanisms to control the operating speed of the mechanism to adapt it for varying amounts of delivered torque in accordance with varying amounts of work or torque resistance to be overcome.

The housing I is provided with the boss 2 having a bore 3 in which is mounted the bearing assembly 4, the inner race of the bearing assembly being suitably mounted on and secured to the drive shaft 5 which is adapted for operative connection with an electric motor or similar power unit.

The boss 2 may be provided with the threads 6 or similar serrated surfaces through which the drive shaft 5 extends, the threads 6 or similar serrated surfaces being arranged helically around the drive shaft 5 to act in association therewith as means for preventing the escape of lubricant around the drive shaft 5 from the chamber 7 of the housing 8 which encloses the transmission mechanism.

The housing 1 is provided with the pilot portion 9 which fits within and engages the bore 10 of the housing 8 to locate the housing 8 in alignment with the housing 1 and the drive shaft 5, the housing 8 being provided with the flange 11 which is secured to the housing 1 by a plurality of screws 12.

The drive shaft 5 is provided with the gear 13 which engages with and drives the gears 14 of the pair or more of countershaft gears A which are radially disposed in the transmission assembly B to provide a balanced design and to eliminate any unbalanced forces within the transmission mechanism, one only of the countershaft gears A being disclosed in Fig. 1, it being understood, however, that any number of countershaft gears A may be utilized in a manner as indicated in Figs. 4 and 5 relating to the transmission assembly C hereinafter more fully described.

The countershaft gears A are rotatably supported by the bushings 16 on the countershafts 17 which are rigidly supported in the bosses 18 and 19 of the countershaft carrier or housing 20, the countershaft 17 being retained against turning by the pins 21 extending through the bosses 18.

The housing 8 is provided with the boss 22 having the bore 23 in which is fixedly mounted the outer race of the bearing assembly 24, the bearing assembly 24 having its inner race fixedly secured on the cylindrical portion 25 of the driven shaft 26, the cylindrical portion 25 extending through the threads or serrated portion 27 of the bosses 22 to retain and prevent lubricant from escape out of the chamber 7 and around the cylindrical portion 25 of the driven shaft 26 in a manner similar to that described relative to the serrated or threaded portion 6 of the boss 2 of the housing 1.

The driven shaft 26 is provided with the cylindrical portion 28 together with the threaded end 29 which thus adapts the driven shaft 26 to be secured to and to support any suitable mechanism to be driven by the transmission assembly B such as chucks, collets and similar units for holding and driving drills, reamers, taps and similar tools in machining and similar operations, said chucks, collets or similar mechanisms not being disclosed as these may be of conventional construction.

The driven shaft 26 is provided with the extension or pilot journal 30 which is rotatably mounted in and supported by the bushing 31 which forms a bearing therefor, the bushing 31 being suitably retained in the bore 32 at the rear end of the drive shaft 5.

The driven shaft 26 is retained longitudinally by the collar 33 which abuts the front side of the bearing assembly 24, the collar 33 further abutting the rear side of the bearing assembly 35, the outer race of the bearing assembly 35 being fixedly secured in the boss 36 of the countershaft carrier 20, the boss 36 being provided with a suitable opening at its rear side to allow the collar 33 together with the rear portion of the driven shaft 26 to extend therethrough.

The driven shaft 26 is provided with the splines 37 on which is mounted the gear 38 which is provided with splined portions similar to 37 to support the gear 38 thereon and to insure a driving engagement between the gear 38 and the driven shaft 26.

The thrust washer 39 is interposed between the rear surface of the gear 13 and the front surface of the gear 38 to further space the drive shaft 5 and the driven shaft 26 longitudinally and to provide a wear member between the surfaces of the gears 13 and 38.

Also the thrust washer 40 is interposed between the rear face of the gear 38 and the front surface of the bearing assembly 35 to further retain and position the driven shaft 26.

The countershaft gears A are each provided with the gears 41 which engage with and are adapted to drive the gear 38.

It is now to be noted that the countershaft carrier 20 is further provided with the boss 42 at its forward side, the boss 42 being provided with a bore 43 in which is fixedly secured the bushing 44 which provides an outer bearing race for a plurality of rollers 45 which may be of flexible or rigid design, said rollers 45 being disclosed with flexible construction, the rollers 45 engaging the cylindrical surface 46 of the clutch gear 47 which engages with and is adapted to be driven by the gears 48 of the countershaft gears A.

The clutch gear 47 is provided with a bore in which is fixedly retained and assembled the bushing 50 which forms a bearing on the drive shaft 5, the clutch gear 47 thus being rotatably mounted on the drive shaft 5.

The clutch gear 47 is provided with the shoulder portion 51 for retaining the rollers 45 longitudinally in one direction, the clutch gear 47 being further provided with the flange 52 which is provided with the plurality of bores 53 therethrough, one only of said bores being disclosed in Fig. 1.

It is now to be noted that the countershaft carrier is rotatably supported at its front side by the rollers 45 which in turn are supported by the clutch gear 47 which is rotatably mounted on the drive shaft 5.

Also the rear end of the countershaft carrier 20 is rotatably supported by the bearing assembly 35 which in turn is supported on the driven shaft 26 which is rotatably supported at its rear portion in the bearing assembly 24, the pilot journal 30 of the driven shaft 26 being further rotatably supported in the rear portion of the drive shaft 5, the drive shaft 5 being thus further supported at its rear portion in alignment with the driven shaft 26.

The drive shaft 5 is further provided with the splined portion 54 on which is mounted a clutch member 55 which is provided with a hub portion 56 having splines similar to and for engaging the splined portion 54 of the drive shaft 5, thus insuring that the clutch member 55 will be fixedly retained on and driven by the drive shaft 5.

The hub portion 56 of the clutch member 55 is located longitudinally by engaging the rear surface of the bearing assembly 4 and by a suitable shoulder portion at the rear end of the splined portion 54 on the drive shaft 5.

The flange 52 of the clutch gear 47 is provided with a plurality of bores 57 in each of which is assembled a cup or housing 58 for enclosing and supporting the resilient members or springs 59, the cups or housings 58 being provided with flanges 60 which engage suitable counterbore surfaces in the flange 52 of the clutch gear 47 for absorbing the end thrust of the springs 59, one only of the springs 59 and housings 58 being disclosed in Fig. 1.

Also it is to be understood that the housings 58 and springs 59 will be located radially around the axis of the drive shaft 5 and driven shaft 26 at points between the pins or shafts 61 which are fixedly mounted in the flange 62 of the clutch member 63, the pins or shafts 61 being provided in suitable quantities for mounting between the housings 58 as desired, each of the pins 61 being secured in the flange 62 as by riveting as at 64.

The clutch member 63 is provided with the hub portion 65 which is hollow in construction and is provided on its outer side with the cylindrical surface 66 which provides a bearing for slidably supporting the clutch disc 67 to which is suitably secured, as by the rivets 68, or by vulcanizing or similar means, the friction facings 69 and 70, the friction facings 69 and 70 being of annular or ring construction.

The clutch facings 69 and 70 are constructed of materials having friction engaging characteristics such as fabric, metal, or similar material which will permit frictional engagement between the rear surface 71 of the clutch member 55 and the front surface 72 of the flange 62 of the clutch member 63 to permit frictional driving engagement between the clutch members 55 and 63 and at the same time to provide slippage therebetween as required in the operation of my transmission.

It is to be noted that the thrust of the springs 59 will tend to cause the clutch member 63 to cause the clutch disc 67 to slidably move along the cylindrical surface 66 to cause a frictional driving engagement between the friction facings 69 and 70 and the surfaces 71 and 72 respectively of the clutch members 55 and 63, the reaction of the springs 59 tending to cause the rear end surface of the hub 49 of the clutch gear 47 to move toward the front surface of the gear 13, thus retaining and locating the clutch gear 47 longitudinally in one direction, the clutch gear 47 however being adapted to be actuated in an opposite direction when the thrust of the meshing engagement of the spiral teeth of the clutch gear 47 and the gears 48 tends to increase the contact pressure of the clutch member 63 with the facing 70.

It is also to be noted that the thrust washers 73 and 74 may be interposed between the end surfaces of the countershaft gears A and the inside surfaces of the bosses 18 and 19 to provide wear surfaces for absorbing end thrust reactions developed in the countershaft gears A.

It is now to be noted that the gear mechanism, as herein disclosed in Fig. 1, as above described, and in the following figures of the drawings of my invention, are similar in some ways to the gearing disclosed in my U. S. Letters Patent, #1,956,078, for Transmission, issued April 24, 1934, but this present application further discloses new improvements which constitute a distinct advance in the design and operation of automatic transmissions.

In my present invention it will be noted that instead of driving a flywheel member, I now utilize, as disclosed in Fig. 1, a clutch mechanism which is operatively connected with the clutch gear 47, and it is to be noted that the gear 47 together with its engaging gears 48 form a gear train which preferably is constructed with spiral or similar teeth which will provide an end thrust reaction between the engaging gears 47 and 48 so that the clutch gear 47, by its driving engagement with the gears 48, will be actuated to move longitudinally toward the clutch member 55 which will develop an added thrust against the clutch member 63 which in turn will cause an increased frictional driving engagement between the surfaces 71 and 72 of the clutch members 55 and 63 with the facings 69 and 70.

Also it is to be noted that the thrust or driving engagement between the facings 69 and 70 and the clutch members 55 and 63 will be increased with an increased load of the teeth of the spiral gears 47 and 48 thus increasing the amount of torque reactions which are fed back into the drive shaft 5 in accordance with the amount of torque resistance imposed upon the driven shaft 26.

It is now to be noted that my transmission is designed and constructed to automatically accomplish changes of speed in accordance with an amount of torque resistance imposed thereon, as on the driven shaft 26 and its operatively connected parts, and in my invention the reactionary forces thus imposed on the driven shaft 26 and its operatively connected parts are used to feed back to the drive shaft thereby resisting the countershaft carrier 20 from running backwards or, in other words, from turning in one direction.

My invention further provides that said back feeding of the rectionary forces imposed upon the driven shaft 26 to the drive shaft 5 will accomplish inverse torque variations, said back feeding being increased in accordance with the increase of the torque resistance or reactionary forces.

It is well known that in the operation of a planetary transmission mechanism involving a system planetary operation, the reaction developed by the driving engagement between a low speed gear such as 38 and the gears such as 41 will tend to drive or operate the countershaft carrier 20 in a backward direction, or in other words, in a direction opposite to that of a driving shaft such as 5 and to avoid and prevent the countershaft carrier 20 from operating in said backward or reverse direction, I provide the gears 47 and 48 with an overdrive ratio relative to the speed of the drive shaft 5, and consequently of an electrical power unit or similar mechanism which may be operatively connected with and for driving the drive shaft 5.

In other words, the reactionary forces imposed on the driven shaft 26 will be transmitted to the countershaft carrier 20 through the countershaft gears A and due to the engagement of the facings 69 and 70 with the clutch members 55 and 63, the countershaft gears A, together with the countershaft carrier 20 will be resisted from turning in said backward or reverse direction which will cause the countershaft gears A, together with the countershaft carrier 20, to tend to revolve in the same or like direction as that of the drive shaft 5 with the result that the gears 48 will transmit said reaction torque of the countershaft carrier 20 together with the countershaft gears A, through their driving engagement with the gear 47, back through the clutch members 55 and 63 and their operatively connected parts into the drive shaft 5 of the transmission assembly B.

It is also self evident that there will be some friction losses in the operation of the clutch mechanism above disclosed, yet by selecting an overdrive ratio between the gears 48 and 47 very close to the speed of the drive shaft 5, said friction loss is decreased to a minimum and can be even reduced to less than the loss due to any friction and heat developed by the driving engagement of the gears 48 and 47 as the feeding back is an accomplished fact as soon as there is a speed available in excess of the speed of the drive shaft 5.

Therefore in the mechanism above disclosed, it will be noted that for low speed operation with the countershaft carrier 20 standing still, the speed of the clutch gear 47 is that of the selected overdrive speed ratio which, for the ratio disclosed between the gears 48 and 47, will be assumed to be approximately 3% over the speed of the drive shaft 5.

Also, in high speed operation, when the whole transmission mechanism revolves, the speed of the over drive gear mechanism will be that of the drive shaft 5 so that the variation of the speed of operation of the clutch gear 47 and its clutch mechanism, through the whole speed range from high to low speed, will be between the speed of the drive shaft 5 and the overdrive speed, or substantially only 3% or whatever the selected overdrive gear ratio is, and therefore the energy absorbed by the clutch gear 47 and the clutch mechanism operatively connected therewith will range in the above case from zero amount, or nothing, for high speed operation to the maximum of substantially 3% for low speed operation.

It will be noted that the transmission assembly B is provided with the drive shaft having the drive gear 13 fixedly mounted thereon which will drive the countershaft gears A, which in turn will drive the driven gear 38 of the driven shaft 26, said drive shaft 5 and its gear 13 constituting the sole means for driving the countershaft gears A and the driven shaft 26 in low speed operation when the countershaft carrier 20 is standing still.

Also the transmission assembly B is provided with the clutch member 55 which provides a drive through the clutch facings 69 and 70 and the clutch member 63 and then through the flange 52 to the clutch gear 47, and until the torque reaction becomes large enough to start to move the clutch there is direct high speed drive, said driving means being distinct from the sole driving means utilized in the low speed operation, the gears 41 of the countershaft gears A driving the driven gear 38 of the driven shaft 26.

It will be thus noted that for change speed operation of the transmission between high speed operation, with the transmission gear mechanism revolving as a unit, and low speed operation with the countershaft carrier 20 standing still, the drive from the drive shaft 5 to the driven shaft 26 is divided between the two driving mechanisms above disclosed.

Also it is to be noted that the clutch mechanism will be of such capacity so as to hold and absorb the reactionary forces created by the gear driving mechanism at full engine torque, or in other words, at the maximum torque developed by the power unit operatively connected with the drive shaft 5.

As the torque required on the driven shaft 26 increases above and over the torque developed in the drive shaft 5, the reactionary forces will be increased on the countershaft carrier 20, and this increase in the reactionary forces is transmitted to the clutch gear 47 and will be transmitted through the spiral gears 48 of the countershaft A to the clutch gear 47 and then through the clutch member 63 to the facings 69 and 70, together with the clutch member 55, the increase of the reactionary forces in the transmission assembly thereby increasing the clutch pressure and with the development of this increased clutch pressure, the clutch mechanism is prevented from slipping more than is needed, in accordance with the reactions imposed on the transmission assembly.

Therefore it will be readily noted from the above explanation that the heavier the load imposed on the transmission through the driven shaft 26, the greater will be the torque reaction, and consequently the amount of energy fed back to the drive shaft 5 through the clutch mechanism will also be greater.

Fig. 2 discloses my transmission mechanism when installed in an automotive vehicle and similar mechanism, of which a clutch housing 75 is disclosed as being mounted on the crank case 76 of an engine assembly, the engine assembly being operatively connected with the drive shaft 77 in a conventional manner by means of a conventional clutch mechanism operatively mounted in the clutch housing 75, said clutch mechanism being omitted as this may be of conventional construction as now used in many automotive vehicles.

It is to be noted that the clutch shaft 77 will be a driven member of said conventional clutch mechanism and will be similar to the drive shaft 5 as disclosed in Fig. 1 and will be provided with the gear 77A which engages and meshes with the gears 78 of the countershaft gears D of the transmission assembly C.

The countershaft gears D are provided with splined portions which engage and fit with the splined portions 79 of the countershafts 80, each of which are provided with a countershaft gear 81 which may be constructed integrally with the countershafts 80 or mounted separately thereon and suitably secured therewith to insure that the countershaft gear 81 will turn with the countershafts 80 and also with the countershaft gears D which are fixedly secured on the countershafts 80 by the splined portions 79.

The countershaft carrier 82 in the transmission assembly C is provided with the boss portions 83 having bores therethrough for receiving and forming an outer raceway for the rollers 84 which may be of solid or flexible construction, said rollers 84 being disclosed as being of flexible construction in Fig. 2, said rollers 84 having their inner bearing on journal portions of the countershaft 80.

The rollers 84 are retained longitudinally by the thrust washers 85 which are interposed between the rear edges of the bosses 83 and the forward surfaces of the countershaft gears 81, the rollers 84 being further retained longitudinally by the thrust washers 86 which are interposed between the front edge surfaces of the bosses 83 and the rear surfaces of the gears 78 of the countershaft gears D.

The countershaft carrier 82 is further provided with the bosses 87 having a bore therethrough for receiving the bushings 88 which are fixedly secured therein and form a bearing on the journal portions 89 of the countershafts 80.

The thrust washers 90 are interposed between the rear surfaces of the bosses 87 and the forward surfaces of the gears 91 of the countershaft gears D.

Also the thrust washers 92 are mounted on the forward end of the journal portions 89 of the countershafts 80 adjacent the front end surfaces of the bosses 87.

The thrust washer 92 is retained adjacent the bosses 87 at the ends of the journal portions 89 of the countershafts 80 by the nut 93 which threadably engages extension portions of the journal portions 89.

The countershaft carrier 82 is provided with a boss portion 94 in which is mounted the bearing assembly 95 in a manner similar to that of the bearing assembly 35 of Fig. 1, the bearing assembly 95 thus rotatably supporting the rear portion of the countershaft carrier 82, the inner race of the bearing assembly 95 being fixedly supported on the journal portion 96 of the driven shaft 97.

Also the countershaft carrier 82 is provided with a boss portion 98 at its forward end for receiving and supporting the sleeve 99 which forms the outer race for the rollers 100 which are rollably mounted on and engage the cylindrical surface 101 of the clutch gear 102, the cylindrical surface 101 forming the inner race for the rollers 100 and thus rotatably supporting the clutch gear 102 within the countershaft carrier 82.

It is to be noted that the clutch gear 102 is provided with spiral teeth which engage with similar spiral teeth on the gears 91 of the countershaft gears D.

It is also to be noted that the clutch member 55 is mounted on the splined portions 54 of the drive shaft 77 in a similar manner to that disclosed in Fig. 1, the clutch member 55 being provided with a friction surface 71 for engaging the facing 69.

The facings 69 and 70 are suitably secured to the disc 67 which is slidably supported on the cylindrical surface 66 of the clutch member 103 in a similar manner to that disclosed relative to the clutch member 63, Fig. 1, the clutch member 103 being provided with the frictional surface 72 for engagement with the facing 70.

It is to be noted that the flange 52 of the clutch gear 102 will be provided with a plurality of housings 58 for containing and supporting resilient members or springs 59 in a similar way to that disclosed in Fig. 1, the springs 59 tending to urge the clutch member 103 toward and in engagement with the facing 70, the clutch member 103 being provided with the hub portion 104 which is provided with a bore for receiving the bushing 105 which is fixedly retained therein and forms a bearing for slidably engaging the journal portion 106 of the drive shaft 77.

It is to be noted that the hub portion 104 of the clutch member 103 will be provided with a plurality of teeth, dog, or jaw portions 107 each of which are provided with an angular surface 108, each of which is adapted to be engaged by the similar tooth, dog or jaw 109 formed on the inner side of the portion of the clutch gear 102 having the cylindrical surface 101 therearound.

It is now to be noted that the mesh engagement of the spiral gears 91 of the countershaft gears D with the clutch gear 102 will develop an end thrust on the clutch gear 102 which will increase the pressure of engagement between the facings 69 and 70 and the clutch members 55 and 103 in a similar manner to that disclosed in the transmission assembly B of Fig. 1.

Also it is now to be noted that whereas by using the spiral gears 102 and 91, the side or end thrust created by said gears may be sufficient in many instances to increase the pressure of the clutch engaging members to prevent excessive slipping therebetween, in many instances it will be found that by using the tooth, dog or jaw clutch above desecribed between the clutch member 103 and the clutch gear 102, and as disclosed in Figs. 2 and 6, a much better and more efficient regulation for the engaging pressure of the clutch mechanism is obtained and at the same time provides for additional end thrust pressure where desired over that developed by the driving engagement between the gear 91 and the clutch gear 102, this being especially desirable where the facings 69 and 70 are located in the chambers 7 or 118 and when they thus would be operating in oil or similar lubricant contained in said chambers 7 or 118, it being understood that the pins 61 will move radially in the slots 52A when the tooth, dog or jaw clutch is used.

It is now to be noted that the front end portion of the driven shaft 97 will be supported in the rear end portion of the drive shaft 77 in a similar manner to that described relative to the driven shaft 26 and the drive shaft 5 of Fig. 1.

The gear mechanism of the transmission assembly C is enclosed within the housing 110 which is provided with the flange 111 having a bore 112 for engaging the pilot portion 113 of the clutch housing 75 to support and align the housing 110 with the axes of the drive shaft 77 and the driven shaft 97, the housing 110 being secured to the clutch housing 75 by a plurality of screws 114 which extend through the rear wall portion of the clutch housing 75 and threadably engage the flange 111 of the housing 110.

The housing 110 is also provided with a bore 115 at its rear end for receiving the pilot portion 116 of the cover member 117 which thus closes the rear end of the housing 110 to provide the chamber 118 in which the gear mechanism of the transmission assembly C is contained and operates.

The cover 117 is provided with the boss portion 119 having a bore 120 therein for receiving the outer race of the bearing assembly 121, the outer race of the bearing assembly 121 being suitably secured in the bore 120 of the boss 119 while the inner race of the bearing assembly 121 is suitably retained on the cylindrical surface 122 of the driven shaft 97.

The driven shaft 97 is provided with the splined portion 123 together with the extension portion 124 which extends through a suitable opening in the boss portion 125, the boss portion 125 being provided with a recess 126 for containing the packing material 127 which prevents lubricant from escaping from the chamber 118 around the extension portion 124 of the driven shaft 97.

The extension portion 124 of the driven shaft 97 is provided with splines 128, the driven shaft 97 being further provided with the threaded end portion 129, the splines 128 and the threaded end 129 facilitating the mounting and securing of driving flanges of propeller shaft and similar mechanisms as utilized in automotive vehicles for transmitting driving torque between the transmission assembly C and the axle and wheel driving mechanism of an automotive vehicle.

It is now to be noted that the countershaft carriers 20 and 82 will have its intermediate wall portions, extending between its end portions, cut or broken away as disclosed at 131 in Fig. 5 to permit the countershaft gears A and D to extend therethrough for engagement with their associated gears which are assembled to be located axially of the drive and driven shafts, the countershaft gears A and D thus not only being each adapted to rotate about its individual axis but also to move around the axis of the respective transmission assemblies.

The hub 132 is provided with splines for engaging the spline portion 123 of the driven shaft 97, thus adapting the hub 132 to be shifted longitudinally on the driven shaft 97 and at the same time to drive the shaft 97, the hub 132 being provided with the gear 133 which is constructed to fixedly rotate with the hub member 132.

The hub member 132 is provided with the flange 134 to which is secured the shift collar or member 135 which in turn is provided with the annular gear 136, the shift collar 135 being provided with the bore 137 for fitting over a pilot portion of the hub 132, the shift collar 135 being secured to the flange 134 by a plurality of rivets 138, one of which is disclosed in Fig. 2.

The shift collar 135 and the gear 136 form an annular gear unit on the outside of which is formed the groove 139 which is engaged by the flange or finger member 140 which is provided with a concave surface to conform to the bottom surface of the groove 139, the flange 140 thus being slidably mounted and adapted to move the shift collar 135, together with the annular gear 136 and the hub 132, longitudinally on the spline portion 123 of the driven shaft 97 to permit the gear 133 of the hub 132, or the annular gear 136 on the shift collar 135, to be selectively positioned for operatively engaging and meshing with the gears 81 of the countershaft gears D.

The housing 110 is provided with the opening 141 through which extends the flange or finger member 140, the flange 140 being provided with the hub 142 which is fixedly secured to the shaft 143 by the pin 144.

The opening 141 of the housing 110 is covered and closed by the housing 145 which is secured to the housing 110 by the screws 146 and is provided with oppositely disposed bosses 147 in which are suitably secured the bushings 148 which form bearings for slidably supporting the shaft 143.

The flexible shaft 149 may be suitably secured to the end of the shaft 143, the flexible shaft 149 being adapted to slidably operate longitudinally in the flexible tubing 150, the flexible tubing 150 being suitably supported by brackets 151 which may be suitably arranged and located to permit the flexible tubing 150 and the flexible shaft 149 to be extended from the transmission assembly C to a convenient point adjacent the operator of an automotive vehicle, the flexible shaft 149 being provided with suitable handle portions to permit the operator of the vehicle to slidably operate the flexible shaft 149 which will in turn slidably move the shaft 143, together with the flange 140 and the hub 142, so that the portion of the flange 140 engaging the groove 139 of the collar 135 will position the gear 133 and the annular gear 136 as desired, relative to meshing engagement with the gears 81 fixedly mounted on the countershafts 80.

It is now to be noted that, when the annular gear 136 and the gear 133 are in the position as shown by the full lines in Fig. 2, the transmission mechanism will be in neutral and in said neutral position the countershaft gears 81 are disconnected from driving engagement with the gear 133 or the annular gear 136.

When the collar 135 is shifted to the left, as viewed in Fig. 2, the annular gear 136 will slide over and mesh with the outside portions of the countershaft gears 81, thus establishing a driving connection between the countershaft gears 81 and the annular gear 136 together with the driven shaft 97.

Also when the collar 135, together with the gear 133, is shifted to the right as viewed in Fig. 2, the gear 133 will mesh with the inside portions of the countershaft gears 81, as indicated by the dotted lines 152, so that there will be a driving connection between the countershaft gears 81 and the driven shaft 97 through the gear 133, and in which position the annular gear 136 will be shifted out of engagement with the countershaft gears 81.

The gear 133 will be provided with the undercut portion 153 which will allow it to slidably move to the left adjacent the boss portion 94 of the countershaft carrier 82, and at the same time to maintain an operating clearance therebetween.

It is also to be noted that the housing 145 is provided with the boss portion 154 which extends into the chamber 118 of the housing 110 and is provided with the bore 155 in which is slidably mounted the shaft 156 which is secured to the flange 140 as by riveting, as shown at 157, the shaft 156 thus being adapted to be moved by the flexible shaft 149 when the flange 140 is shifted to change the position of the collar 135 and its operatively connected gears.

Also the countershaft carrier 82 is provided with the flange 158 which is provided with a plurality of holes 159 or similar lock engaging surfaces located therearound, the holes 159 being adapted to be engaged by the shaft 156 when it is shifted to the left, as disclosed in Fig. 2.

It is to be noted that when the annular gear 136 has been shifted to the left to engage the countershaft gears 81, a reverse operation or driving movement of the driven shaft 97 will be accomplished, and at the same time the shaft 156 will be moved to the left, as viewed in Fig. 2, to enter and engage one of the openings 159 in the flange 158 of the countershaft carrier 82, thus locking the countershaft carrier 82 against rotative movement, thus preventing the countershaft carrier 82, together with its operatively supported gear mechanism from operating with "free wheeling" characteristics when the transmission is operated in its reverse driving direction to drive the automotive vehicle or similar unit in a reverse direction.

Therefore it will be seen that my invention will be provided with a suitable locking mechanism which will automatically lock my transmission mechanism against "free wheeling" operation in reverse operation of the transmission to conform to the legislation of many states or countries which require such locking mechanisms to be applied to transmissions.

Also it is to be noted that the use of the clutch mechanism comprising the clutch members 55 and 103, the disc 67 and its facings 69 and 70, together with the clutch gear 102 and the countershaft carrier 82 and the parts operatively supported thereby and connected therewith will provide a mass that will function similarly to a conventional flywheel of an engine of an automotive vehicle, thus permitting said conventional flywheel of said engine to be greatly decreased in weight, to accomplish an initial saving in the manufacture of an important part of an engine assembly in a vehicle equipped with my invention, and at the same time providing means whereby an engine assembly will be able to operate with extreme smoothness without danger from high speed operation of excessive flywheel masses.

In operation, the transmission assembly C as disclosed in Fig. 2, will first be described.

With the drive shaft 77 operatively connected with a prime mover or power unit such as an internal combustion engine, the drive shaft 77 will operatively rotate in the direction indicated by the arrow 160 in Fig. 5, and will, through the gear 77A, drive and rotate the countershaft gears D about their axes while supported in the countershaft carrier 130.

Then with the gear 133 located in meshed engagement, as indicated by the dotted lines 152, with the countershaft gears 81, the driven shaft 97 will be also rotatably driven in the direction indicated by the arrow 160 in Fig. 5.

As torsional resistance is imposed upon the driven shaft 97, due to being connected with the driving mechanism of an automotive vehicle, the countershaft carrier 82, which normally would tend to be driven in a reverse direction from that indicated by the arrow 160 in Fig. 5, will be prevented from thus running backwards by the driving engagement between the spiral gears 91 of the countershaft gears D and the clutch gear 102, the pitch or teeth of such spiral gears exerting an end or side thrust tending to move the clutch member 103 to a closer or higher pressure engagement with the facing 70, the facing 69 also being forced to a closer or higher pressure engagement with the clutch member 55, said engagement pressure of the facings 69 and 70 with the clutch members 55 and 103 being augmented by the springs 59.

The torque reactions imposed on the counter shaft carrier 82 by the operatively mounted gears thereon thus are fed back into the drive shaft 77 through the clutch mechanism and the revolvably mounted countershaft carrier is thus counteracted against rotating or running backwards or in an opposite direction to the arrow 160, Fig. 5, as it would normally be inclined to do without the clutch mechanism to hold it.

Then with the countershaft carrier 82 being held in a substantially still position the speed of the clutch gear 102 is the selected over drive speed which, as above described, is assumed to be approximately 3% over the speed of the drive shaft 77.

As the torque load imposed on the driven shaft 97 is increased with a consequent decrease in its revolving speed, the speed of the drive shaft 77 will not vary and the countershaft carrier 82 with its operatively supported gear mechanism will move in the direction of rotation of the drive shaft 77 or of the arrow 160, Fig. 5, until the countershaft carrier 82 together with its operatively supported gear mechanism increases its speed to attain that of the drive shaft 77 with decreasing torque of the driven shaft and when this is attained or high speed is reached, the entire gear mechanism of the transmission mechanism revolves as a unit with the result that the speed of the over drive gear mechanism is equal to engine speed or the speed of the drive shaft 77, with the further result that the energy which is absorbed by the clutch mechanism ranges from substantially nothing for high speed operation to substantially a maximum of 3% for low speed operation with an assumed over speed over engine speed of 3%.

Also the jaw or teeth members 107 and 109 of the clutch member 103 and clutch gear 102 respectively will, due to the engagement of the angular surfaces 108, tend to increase the pressure engagement of the friction facings 69 and 70 between the clutch members 55 and 103 to prevent excessive slipping and to provide for regulation for the pressure engagement of the clutch mechanism thus resulting in feeding the torque reactions into the drive shaft 77 through the clutch mechanism with increased amounts in accordance with greater torques imposed on the driven shaft 97.

It is therefore to be understood that the revolving movement or motion of the countershaft carrier 82 together with its associated parts and gears tends to be in a forward driving connection, as indicated by the arrow 160 in Fig. 5, and also the countershaft carrier 82 will stand still during low speed operation only, during which low speed operation the countershaft gears D will move in the forward or driving direction as indicated by the arrow 160A in Fig. 5.

Also with the countershaft carrier 82 locked or restrained by the clutch mechanism from backward movement, the tendency of the transmission mechanism to move in the forward or driving direction will be quick and sensitively responsive to a change in the torque of the driven shaft 97 and this will result in the necessary changes of speed in the transmission assembly, in the vehicle or similar installation, being automatically and continuously obtained without the usual and conventional shift changes therebetween, and with smooth changes of driving speed which will result therefrom in accordance with the driving torque load reactions imposed by the driving portions of the automotive vehicle with which the driven shaft 97 is connected, and the driving ratios of the transmission assembly, when the countershaft carrier 82 is revolving, will be the result of the relative difference or differential movement between the rotating countershaft carrier 82 and the gear mechanism operatively driving same.

With the shifting of the annular gear 136 to a position of engagement with the countershaft gears 81 of the countershaft gears D, the collar 135, together with the hub 132 will be caused to operate or revolve in an opposite direction from that of the arrow 160 in Fig. 5, with the result that the driven shaft 97 will operate in an opposite or reversed direction from that of the drive shaft 77, thus providing for reverse operation of the transmission mechanism.

Also with the collar 135 shifted to its position for reverse operation of the transmission mechanism, or in other words, with the annular gear 136 meshed with the countershaft gears 81, the shaft 156 will engage one of the holes 159 of the flange 158 of the countershaft carrier 82, thus locking the transmission against "free wheeling" operation during the reverse driving operation of the transmission.

The transmission assembly A, as disclosed in Fig. 1, operates in a similar manner, but for industrial applications for use in driving machine units in the industrial field by means of electrical power or similar unit, reverse and switch means are eliminated.

The general operation of the transmission assembly A, however, is similar in principle to that of the transmission assembly C.

It is to be understood that whereas I have disclosed my transmission assembly as being especially adapted for automotive vehicles and for torque developing power units for driving mechanical units in industrial installations, I do not limit my invention to such units or installations or uses as it is readily adaptable to many various mechanisms in which a transmission mechanism is required, and in which driving torque is transmitted.

I claim:

1. In a transmission, the combination of a drive shaft rotatably mounted, a driven shaft rotatably mounted, a gear fixedly mounted on said drive shaft and adapted to rotate therewith, a second gear fixedly mounted on said driven shaft and adapted to rotate therewith, a clutch gear rotatably mounted on said drive shaft and provided with a flange, a clutch member slidably supported by said flange of said clutch gear, said clutch member being provided with a friction contact surface, a disc slidably and rotatably supported on said clutch member and provided with oppositely disposed friction facings, one of said friction facings being adapted to engage said friction contact surface of said clutch member, a second clutch member fixedly supported on said drive shaft and adapted to rotate therewith, said second clutch member being provided with a friction contact surface adapted to engage one of said friction facings of said disc, resilient members supported by said flange of said first mentioned clutch member and adapted to cause increased pressure between said facings of said disc and said friction contact surfaces of said first mentioned and said second clutch member, a carrier member rotatably supported on said drive and said driven shafts, said carrier member being adapted to rotate about the axes of said drive and said driven shafts, a plurality of countershafts fixedly supported by said carrier member and adapted to rotate therewith, and countershaft gears rotatably mounted on each of said countershafts and adapted to rotate with said carrier member about the axes of said drive and said driven shafts, each of said countershaft gears being provided with a gear meshing with said gear fixedly mounted on said drive shaft, each of said countershaft gears being provided with a gear meshing with said second gear fixedly mounted on said driven shaft, each of said countershaft gears being further provided with a gear meshing with said clutch gear rotatably mounted on said drive shaft.

2. In a transmission, the combination of a drive shaft rotatably mounted and provided with a drive gear, a driven shaft rotatably mounted, a clutch gear rotatably mounted on said drive shaft and provided with a flange, a clutch member slidably supported, a friction disc assembly slidably and rotatably mounted on said clutch member and adapted to frictionally engage said clutch member, a second clutch member fixedly supported on said drive shaft and adapted to frictionally engage said friction disc assembly, resilient members mounted to cause increased pressure between said friction disc assembly and said first mentioned and said second clutch members, a carrier member rotatably supported on said drive and said driven shafts, a plurality of countershafts rotatably supported in said carrier member, said countershafts being further adapted to rotate with said carrier member, a gear fixedly mounted on each of said countershafts and adapted to mesh with said clutch gear, a second gear fixedly mounted on each of said countershafts and adapted to mesh with said drive gear of said drive shaft, a hub member slidably mounted on said driven shaft and provided with a spur gear together with an annular gear, a third gear fixedly mounted on each of said countershafts and adapted to mesh either with said spur gear or said annular gear of said hub member and means for shifting said hub member to cause said spur gear or said annular gear of said hub member to be meshed with said third gears of said countershafts.

3. In a transmission, the combination of a drive shaft, a driven shaft, a clutch mechanism having a member secured to said drive shaft, said clutch mechanism being further provided with a second member provided with a spiral gear, and means operatively connecting said drive and said driven shafts to feed back reactionary forces developed in said means to said drive shaft to change the speed ratio of and to obtain inverse torque variation between said drive and said driven shafts, said means comprising three gears, one of said gears being operatively connected with said drive shaft, one of said gears being operatively connected with said driven shaft, one of said gears being a spiral gear meshing with said spiral gear of said second member of said clutch mechanism.

4. In a transmission, the combination of a drive shaft, a driven shaft, means operatively connecting said drive and said driven shafts to feed back reactionary forces developed in said means to said drive shaft to change the speed ratio of and to obtain inverse torque variation between said drive and said driven shafts, said means comprising gear members operatively connected between said drive and said driven shafts together with a clutch mechanism operatively connected between said drive shaft and said gear members, and a second clutch means for increasing the pressure engagement of said clutch mechanism with increasing torque reactions.

5. In a transmission, the combination of a drive shaft, a driven shaft, a carrier member rotatably mounted, three gear members rotatably supported by said carrier member and operatively connecting with said drive and said driven shafts, a clutch mechanism operatively connected with said drive shaft and said three gear members to feed torque reaction forces developed in said gear members and said carrier member back into said drive shaft, said clutch mechanism being provided with a friction disc rigidly secured to said drive shaft, and means for increasing the engagement pressure of said clutch mechanism in accordance with an increase of said torque reaction forces.

6. In a transmission, the combination of a drive shaft, a driven shaft, a carrier member rotatably mounted, gear members each comprising three gears rotatably supported by said carrier member and operatively connecting said drive and said driven shafts, and a clutch mechanism operatively connected with said drive shaft and said gear members to feed torque reaction forces developed in said gear members and said carrier member back into said drive shaft, one of said three gears comprised by each of said gear members being provided with teeth adapted to develop thrust reactions axially relative to said gear members.

7. In a transmission, the combination of a drive shaft, a driven shaft, a carrier member rotatably mounted, three gear members rotatably supported by said carrier member and operatively connecting said drive and said driven shafts, and a clutch mechanism operatively connected with said drive shaft and said three gear members to feed torque reaction forces developed in said gear members and said carrier member back into said drive shaft, said means comprising a jaw clutch mechanism operatively connected between said first mentioned clutch mechanism and said three gear members.

8. In a transmission adapted for automatic operation, the combination of a drive shaft, a driven shaft, a counter shaft carrier member rotatably mounted, countershafts operatively mounted in said countershaft carrier and provided with gear means comprising three gears operatively connecting said drive and said driven shafts, a clutch mechanism operatively connecting said drive shaft and said gear means of said countershafts, said clutch mechanism comprising a sole gear having teeth adapted to develop thrust reactions axially of said sole gear to permit back feeding of variable reaction forces developed by said gear means of said countershafts through said clutch mechanism to said drive shaft.

9. In a transmission, the combination of a drive shaft, rotatably mounted, a clutch disc mounted on said drive shaft, a driven shaft rotatably mounted, a carrier member rotatably mounted, gear members rotatably supported by said carrier member and adapted to revolve with said carrier member around the axis of said drive shaft, said gear members operatively connecting said drive and said driven shaft, a second clutch disc rotatably supported and operatively connected with said gear members, friction means between said first mentioned and said second clutch discs, and means for utilizing reaction forces developed in said gear members to develop pressure between said first mentioned and said second clutch discs and said friction means.

10. In a transmission, the combination of a drive shaft rotatably mounted and provided with a drive gear, a driven shaft rotatably mounted, a clutch gear rotatably mounted on said drive shaft, a clutch disc fixedly mounted on said drive shaft, a second clutch disc movably mounted, friction means between said first mentioned and said second clutch discs, means connecting said clutch gear and said second clutch disc to increase pressure between said friction means and said first mentioned and said second clutch discs, and carrier means rotatably supported on said drive and said driven shafts and provided with gear means operatively connecting said drive gear and said driven shaft, said gear means further engaging and driving said clutch gear.

11. In a transmission, the combination of a driving shaft, a driven shaft, a clutch gear rotatably mounted, a planetary gear means rotatably mounted and forming a driving means between said driving and said driven shafts, said planetary gear means further driving said clutch gear, clutch means comprising friction flanges respectively connected with said driving shaft and said clutch gear, and means for feeding back reactionary forces developed in the transmission to increase the engagement pressure of said clutch means, said reactionary forces being fed back in and to increase the torque of said driving shaft.

12. In a transmission, the combination of a drive shaft, a driven shaft, a carrier member rotatably mounted, three gear members rotatably supported by said carrier member and operatively connecting said drive and said driven shafts, a clutch mechanism operatively connected with said drive shaft and provided with gear means connecting with one of said three gear members to feed torque reaction forces developed in said three gear members and said carrier member back into said drive shaft, and means for automatically increasing engagement pressure of said clutch mechanism when the transmission is operated.

13. In a transmission, the combination of a drive shaft provided with gear means, a driven shaft provided with gear means, a carrier member rotatably mounted, three gear members rotatably supported by said carrier member, said three gear members comprising gear members connecting with said gear means of said drive and said driven shafts, and a clutch mechanism provided with a gear member connected with one of said three gear members, said clutch mechanism being connected with said drive shaft, said clutch mechanism being provided with means adapted to feed torque reactions developed in said carrier member and said three gear members back into said drive shaft.

THEODORE M. MUELLER.